United States Patent Office 2,755,149
Patented July 17, 1956

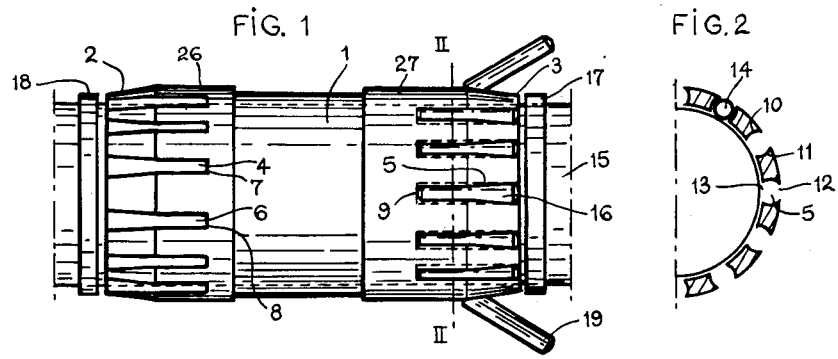
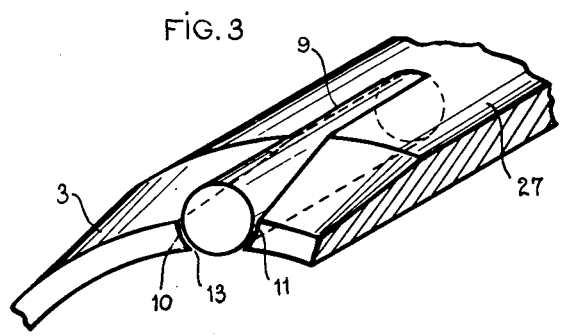
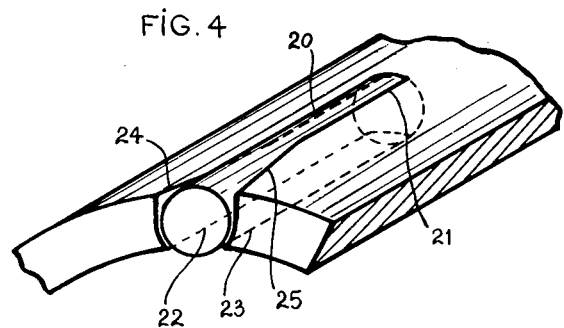

2,755,149

CAGE FOR ANTIFRICTION RUNNING ELEMENTS

Guillaume Ernest Mégel and Henri Mancia, Moutier, Switzerland, assignors to Usines Tornos, Moutier, Switzerland, a body corporate of Switzerland Application June 17, 1953, Serial No. 362,342

Claims priority, application France June 24, 1952

5 Claims. (Cl. 308—216)

The present invention relates to a bearing formed with antifriction running elements such as needles or rollers and is specially concerned with a cage to house these elements.

One has already described various cages for needles or rollers and particularly cages including recesses, each housing a roller, the two small sides of each recess being provided respectively with a teat and the extreme faces of a roller being each centrally slightly chambered to house a teat, so that a such roller is held in the recess of the cage and is prevented from falling out of this recess when the cage is disassembled. This arrangement offers the drawback that whenever one of the rollers, becoming defective, has to be changed, it is necessary to remove the cage from the shaft upon which it was mounted, or to slip this cage beyond an end of the shaft to release the rollers and to be able to impart through the inside of the cage, a radial thrust upon the defective roller to disengage the teats and release the roller.

This operation is not only rather long but also is very delicate as a roller which is an element of a machine of high precision, must be handled with great care. In addition, it is advisable to reduce to the utmost the cases in which it is necessary to move axially the roller engaged on the shaft.

Another drawback of this known form of embodiment arises from the increase in the heating areas resulting from the presence of these teats, particularly at high speeds, and from the wear of the teats, which are due to disappear after a time of utilization rather short if compared with the life of a roller so that the running elements are no more held in position.

The present invention relates to a cage for antifriction running elements such as rollers and needles, including, at least at one of its ends, peripheric housings, uniformly distributed, to receive each a running element, a needle for instance, and this cage is characterized in that each housing is formed by a dead bore merging with an outer aperture in the outer surface of the cage and with an inner aperture in the inner surface of the cage, the distance between the lips of at least one of these apertures being, preferably in their position adjacent the bottom of the dead bore, smaller than the diameter of the needle to be introduced in the said bore, while the said distance in the remainder part of said aperture is greater than said diameter.

According to a particular form of embodiment, the distance between the lips of the corresponding dead bore is smaller than the diameter of the needle along the part of the aperture adjoining the bottom of the corresponding dead bore but becomes wider, preferably gradually, to reach a value greater than the diameter. In this embodiment, it is advantageous to locate the spacing equal to the diameter between the bottom of the dead bore and the plane, transverse to the cage to which are located the centers of gravity of the needles as, in this case, the needles being freely submitted to the action of the gravity when the cage is removed from the outer rolling path, will tilt freely out of their bores through their respective outer apertures, but without quitting said bores.

By way of example, a cage according to the invention adapted for needles and several forms of embodiments of the apertures are described hereafter and illustrated in the annexed drawing.

Figure 1 illustrates in side elevation a cage adapted to receive two sets of needles.

Figure 2 is a section of Figure 1, along the line II—II.

Figures 3, 4 show in diagrammatic perspective view and partly in cross section near a dead bore, two different forms of embodiment of the cage to obtain the varying spacing of the lips of the apertures by which such bore merges into the outer surface of the cage.

In Figures 1 and 2, the reference 1 designates a cage of substantial cylindrical surface and adapted to receive one or two sets of bearing needles. Near each of the peripheric front edges 2 and/or 3 of the cage, are made longitudinal dead bores 4, 5, 6 uniformly distributed, opening in the front edges 2, 3 respectively, the bottoms of these bores being designated 7, 8, 9, and the bores such as 4 and 6, associated with the peripheric front edge 2 being placed, with respect to the dead bores such as 5, associated with the peripheric front edge 3, so that the axis of any dead bore, associated with a peripheric front edge is, preferably, at equal distance to the axis of two adjacent bores associated with the other peripheric front edge.

The side faces 10, 11 of each dead bore are curved, their radius being about the same as the radius of the needles to be inserted therein, and since the thickness of the cage, in the part in which these bores are made, is smaller than the diameter of the needles, each dead bore merges into the outer and inner cylindrical surfaces of the cage by two apertures 12, 13 so that the needle is kept freely in its cut, as shown in 14, projects to bear upon an inner rolling path, illustrated, for instance, by the shaft 15 and upon an outer rolling path, not shown.

When, in a roller bearing such as described and including a single set or two sets of needles, it becomes necessary to change some defective needles on account of their excessive wear, the shaft 15 is to be moved axially to pull the cage and the needles out of the outer rolling path (not shown). The defective needle such as 16 for example is then taken away, by sliding on the shaft 15, towards the right, the set collar 17 for a length equal to the length of the needle 16: this needle can then be pushed out of the cut and replaced by a new one. The set collar 17 is brought in place and the whole cage is inserted in the outer rolling path.

Although the bearing thus described has, when compared with the needle bearings, offered up to now, the advantage of allowing to carry out the above described operation without risking to pull out at the same time all the needles, it remains necessary to thrust aside the set collars 17 or 18, and this is a delicate operation as these collars are forced upon the shaft.

According to a particular form of embodiment of a bearing according to the invention, it is possible to remove any desired needle without touching the set collars 17 and/or 18.

According to this particular embodiment, the spacing of the lips of each aperture located on the outer wall of the cage is, upon some length at least adjacent the bottom of the dead bore, smaller than the diameter of a needle, and increases, preferably progressively, towards the adjoining front edge 2 of the cage up to a value slightly greater than this diameter. Thereby, the part of the cut adjoining the bottom will retain the needle, when engaged, whilst this needle, when placed at the lower part of the cage, can tilt by gravity out of the bore, as shown in 19, Figure 1: the removal of this needle 19 becomes possible without having to move the set collar 17.

Advantageously, the increasing spacing of the lips of the outer apertures is obtained by giving to that part of the cage in which are made the series of cuts, a cylindrical profile in the region 26, 27 of the bottoms 8 and/or 9 contained by a conical or flared profile, slanting towards each front edge 2—3, as shown in Figure 1 and in perspective in Figure 3 illustrating at a larger scale, the part of the cage containng the dead bore of the needle 16, for instance.

This conical shape which gives to the lips, on a part of the length of the cut, a spacing larger than the diameter of the needle, allows an easy handling of the needle when brought in position 19 and an easy removal. Likewise, the setting of a new needle is carried out by simply introducing substantially in an axial direction the new needle in the part having a spacing smaller than the diameter of the needle and tilting the needle in the entire dead bore.

Preferably, the great circle of the conical part is located in a transverse plane between the transverse plane containing all the bottoms 8 or 9 of the dead bores and the transverse plane containng the centers of gravity of the needles, preferably near this plane.

The increase of the spacing of the lips, instead of being produced by the flared end or ends of the cage, can be obtained, as diagrammatically shown in Figure 4 by any suitable process such as milling the outer aperture.

According to this form of realization, each dead bore in the cage 1 is made with a diameter larger than the thickness of the wall of the cage, to obtain an outer longitudinal aperture, the lips of which are indicated 20, 21 and an inner longitudinal aperture, the lips of which are indicated 22 and 23. To obtain the required spacing in the upper aperture, the lips 20 and 21 are milled or filed so as to have slanting parts 24, 25 or to diverge over a length to be chosen as above explained.

What we claim is:

1. A cage for supporting antifriction running elements consisting of a substantial cylindrical sleeve having at least over a part of its length corresponding to that of the running elements to be supported a radial thickness less than the diameter of said elements and provided at the said part of its length with longitudinal dead bores opened at one front edge of said sleeve and having a diameter substantial equal to that of the running elements whereby each of said dead bore merges into the outer surface of the sleeve by means of a longitudinal aperture, the lips of at least one of such apertures being, over a portion of their length adjacent the bottom of the corresponding dead bore, spaced from each other by a distance which is less than the diameter of the running element insertable in said corresponding dead bore while the spacing between the lips, over the remainder part of their length, at least adjacent the open end of the said corresponding dead bore, is greater than the diameter of the said insertable running element.

2. A cage for supporting antifriction running elements consisting of a substantially cylindrical sleeve having an outer cylindrical surface and an inner cylindrical surface concentric with said outer cylindrical surface and spaced therefrom over part at least of its length, for a distance which is less than the diameter of the running elements, a series of longitudinal dead bores in said sleeve opened at one end thereof and having a diameter substantially equal to that of the said running elements, whereby each of said bores merges into the outer and inner cylindrical surfaces respectively by means of an aperture, the lips of each of the apertures thus provided in the outer cylindrical surface being, over at least a portion of the distance between the bottom of the dead bore and the transverse plane containing the center of gravity of the running element insertable in that dead bore, spaced from each other for a distance less than the diameter of said insertable running element while the said lips are, over the remaining portion of the said aperture, spaced from each other for a distance greater than the diameter of the said running element.

3. A cage for supporting antifriction running elements consisting of a substantially cylindrical sleeve having an outer cylindrical surface and an inner cylindrical surface concentric with said outer cylindrical surface and spaced therefrom over part at least of its length, for a distance which is less than the diameter of the running elements, a series of longitudinal dead bores in said sleeve opened at one end thereof and having a diameter substantially equal to that of the said running elements, whereby each of said bores merges into the outer and inner cylindrical surfaces respectively by means of an aperture, the lips of each of the apertures thus provided in the outer cylindrical surface being, over a portion of their length adjacent the bottom of the corresponding dead bore spaced from each other for a distance which is smaller than the diameter of the running element insertable in that bore, while the lips, over the remaining portion of their length, diverge towards the open end of said bore in such a way that they are, in a transverse plane of the dead bore located intermediate the bottom thereof and the transverse plane containing the center of gravity of the running element insertable in said dead bore, spaced from each other for a distance which is equal to the diameter of said running element.

4. A cage as claimed in claim 3 wherein the outer cylindrical surface is flared over its portion comprised between the said intermediate transverse plane and the open end of the bores whereby the lips of the aperture in the outer cylindrical surface diverge progressively towards the open end of the bores.

5. A cage for supporting antifriction running elements, especially for a needle bearing of turning tubes in automatic lathes, submitted to important shearing stress comprising a substantially cylindrical sleeve having at its edge portions, at least over a length equal to that of needles, a radial thickness less than the diameter of the needle, in each of said edge portion a set of uniformly distributed dead bores, the set of dead bores at one edge portion being radially shifted with respect to the set of dead bores at the other edge, the outer surface of said cage being at each of said edge portions flared towards the ends of the cage in such a way that the great circle of each flared portion is located in a transverse plane of the cage, intermediate the bottom of the associated bores and the transverse plane containing the centers of gravity of the running elements insertable in said dead bores.

References Cited in the file of this patent

FOREIGN PATENTS

| 451,825 | Germany | Nov. 3, 1927 |
| 1,003,130 | France | Nov. 14, 1951 |